US010673345B2

(12) United States Patent
Bergogne

(10) Patent No.: US 10,673,345 B2
(45) Date of Patent: Jun. 2, 2020

(54) DC/DC CONVERTER COMPRISING A TRANSFORMER AND TRANSMISSION AND RECOVERY OF A SIGNAL THEREACROSS

(71) Applicant: Commissariat à l'Energie Atomique et aux Energies Alternatives, Paris (FR)

(72) Inventor: Dominique Bergogne, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/440,932

(22) Filed: Jun. 13, 2019

(65) Prior Publication Data

US 2019/0386569 A1 Dec. 19, 2019

(30) Foreign Application Priority Data

Jun. 15, 2018 (FR) .................................... 18 55258

(51) Int. Cl.
*H02M 3/338* (2006.01)
*H02M 1/00* (2006.01)

(52) U.S. Cl.
CPC ........... *H02M 3/3385* (2013.01); *H02M 1/00* (2013.01); *H02M 2001/0009* (2013.01)

(58) Field of Classification Search
CPC ............... H02M 3/28; H02M 3/33507; H02M 3/33523; H02M 3/33569; H02M 3/33592; H02M 3/337; H02M 3/338; H02M 3/3381; H02M 3/3385; H02M 1/00;
(Continued)

(56) References Cited

U.S. PATENT DOCUMENTS 9,948,193 B2 * 4/2018 Ragonese ......... H02M 3/33553
2006/0120115 A1 * 6/2006 Chen ................. H02M 3/33523
363/17

(Continued)

FOREIGN PATENT DOCUMENTS

JP 2009044837 A 2/2009

OTHER PUBLICATIONS

Preliminary Search Report for French Application No. 18/55258 dated Feb. 13, 2019, 2 pages.

*Primary Examiner* — Yemane Mehari
(74) *Attorney, Agent, or Firm* — Moreno IP Law LLC

(57) ABSTRACT

A DC/DC converter comprises a transformer having a primary and a secondary, a winding of the primary forming part of a transformer power supply self-oscillating circuit. The primary side includes a controllable circuit that receives a first digital signal to be transmitted to the secondary, and a modulation device acting on the self-oscillating circuit. The secondary side comprises a detection and de-modulation circuit for recovering the first signal. The modulation device delivers a second signal that controls, via a switch, application of a first DC voltage across the self-oscillating circuit when the second signal is in a first state, the second signal comprising first pulse trains in a second state during first periods of the first signal. The detection and demodulation circuit comprises a device for reconstructing the first pulse trains of the second signal based on interruptions of energy recovered at the secondary, thereby deducing the first signal therefrom.

12 Claims, 4 Drawing Sheets

(58) Field of Classification Search
CPC ......... H02M 2001/0009; Y02B 70/126; Y02B 70/1433; Y02B 70/1475
USPC ...................................................... 363/15–19
See application file for complete search history.

(56) References Cited

U.S. PATENT DOCUMENTS

| | | | |
|---|---|---|---|
| 2008/0192509 A1* | 8/2008 | Dhuyvetter ....... | H02M 3/33523 363/17 |
| 2012/0099345 A1* | 4/2012 | Zhao ...................... | H02M 1/36 363/21.05 |
| 2013/0182781 A1 | 7/2013 | Matsutani | |
| 2013/0188399 A1* | 7/2013 | Tang .................... | H02M 3/335 363/21.1 |
| 2014/0268917 A1* | 9/2014 | Ma .................... | H02M 3/33523 363/21.15 |
| 2014/0313784 A1* | 10/2014 | Strzalkowski .... | H02M 3/33584 363/17 |
| 2017/0358993 A1* | 12/2017 | Ragonese ......... | H02M 3/33553 |

* cited by examiner

DC/DC CONVERTER COMPRISING A TRANSFORMER AND TRANSMISSION AND RECOVERY OF A SIGNAL THEREACROSS

FIELD

The present disclosure generally concerns electronic circuits and, more specifically, DC/DC converters. The present disclosure more specifically concerns the transmission of control signals by such a DC/DC converter.

BACKGROUND

DC/DC converters are very widely used in power applications, that is, to transmit energy, typically from an energy source to a load. Such converters generally provide a galvanic isolation between upstream and downstream of the converter.

DC/DC converters can be found in many energy transfer and conversion application, be the final conversion AC/AC, AC/DC, DC/AC, or DC/DC. As an example, DC/DC power converters can be found in switched-mode power supplies, voltage inverters, voltage regulators, etc.

The transmission of control or low-power signals between upstream and downstream of a DC/DC converter most often requires either a second transformer, or optocoupler-type isolation elements.

Document US 2006/0120115 describes a power conversion system comprising an oscillating circuit, an oscillator control circuit to control oscillating circuit LC, a rectifying circuit coupled to oscillating circuit LC to supply an output DC, and a switching circuit to control the duty cycle of the oscillator control circuit to modulate the power in the oscillating circuit and the rectifying circuit.

Document US 2017/0358993 describes a galvanic isolation DC/DC converter with a bidirectional data transmission.

Document JP 2009 044837 describes a switched-mode power supply device to transmit signals by using a transformer to transmit the energy.

SUMMARY

It would be desirable to be able to transmit low-power or control signals through a DC/DC converter without adversely affecting the energy conversion.

An embodiment overcomes all or part of the disadvantages of usual DC/DC converters.

An embodiment provides an energy and control signal transmission DC/DC converter.

An embodiment provides a DC/DC converter comprising:
a transformer comprising a primary and a secondary, a winding of the primary forming part of a transformer power supply self-oscillating circuit;
on the side of the primary, a controllable circuit in-tended to receive a first digital signal to be transmitted to the secondary and comprising a modulation device acting on said transformer power supply self-oscillating circuit on the side of the primary; and
on the side of the secondary, in parallel with a rectifying circuit, a detection and demodulation circuit, for recovering said first signal,
said first signal comprising first periods in a first state and second periods in a second state, said modulation device delivering a second signal for controlling a switch of application, when said second signal is in said first state, of a first DC voltage across said self-oscillating circuit, said second signal comprising first pulse trains in the second state during said first periods of the first signal and said detection and demodulation circuit to recover said first signal comprising a device for reconstructing said first pulse trains of said second signal based on interruptions of the energy recovered at the secondary, to deduce said first signal therefrom.

According to an embodiment, the first and second periods of the first signal form a second train of pulses having a frequency smaller than the frequency of the pulses contained in the first pulse trains of the second signal.

According to an embodiment, the frequency of the pulses of the first signal is greater, preferably by a ratio of at least 10, than the frequency of the pulses contained in the first pulse trains of the second signal.

According to an embodiment, the resonance frequency of the self-oscillating circuit is greater, preferably by a ratio of at least 10, than the frequency of the pulses contained in the pulse trains of the second signal.

According to an embodiment, the detection circuit detects the presence or the absence of power transmitted to the secondary of the transformer.

According to an embodiment, the presence or the absence of transmitted power is detected by the presence or the absence of current via a voltage drop in a resistor.

According to an embodiment, the detection circuit detects the absence of a current at the output of a rectifying bridge having input terminals coupled across a secondary winding of the transformer.

An embodiment provides a method of transmission of a digital signal by a DC/DC converter comprising a transformer, wherein:
on the side of the primary of the transformer:
 a first digital signal, to be transmitted to the secondary and comprising first periods in a first state and second periods in a second state, is converted into a second signal comprising, during the first periods of the first signal, first trains of pulses from the first state to the second state; and
 a first DC voltage is applied across a self-oscillating circuit when the second signal is in the first state; and
on the secondary side:
 the first pulse trains of the second signal are reconstructed based on interruptions of the energy recovered at the secondary; and
 the first signal is deduced therefrom.

According to an embodiment, the period of the pulses of the first pulse trains is shorter, preferably by a ratio of at least 10, than the period of self-oscillation of the self-oscillating circuit.

According to an embodiment, each pulse represents less than five, preferably one or two, periods of self-oscillation of the self-oscillating circuit.

According to an embodiment, the first and second periods of the first signal form a second pulse train having a frequency smaller than the frequency of the pulses contained in the first pulse trains of the second signal.

According to an embodiment, the method is adapted to the described converter.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

Figure 1:
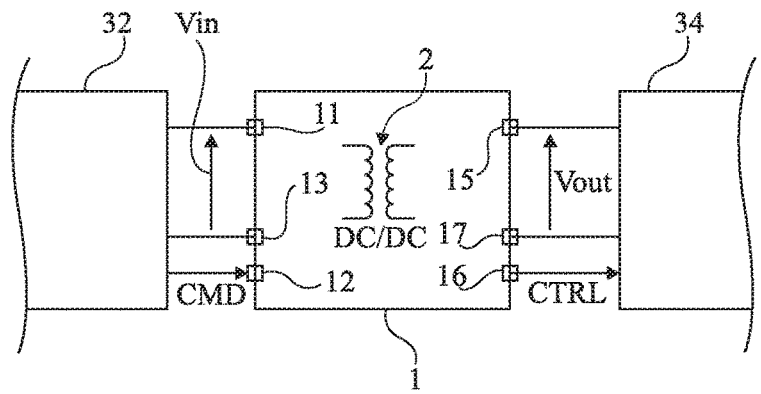
FIG. 1 is a very simplified representation of an example of a system including a DC/DC converter.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the destination of the power signals or of the control signal transferred by the described converter has not been detailed, the embodiments being compatible with usual destinations of such signals which depend on the application. The described embodiments are in particular compatible with usual applications of DC/DC converters. Further, the generation of the control or low-power signals to be transmitted via the DC/DC converter has not been detailed either, the described embodiments being here again compatible with usual techniques of generation of such signals, which depend on the application.

Throughout the present disclosure, the term "connected" is used to designate a direct electrical connection between circuit elements, whereas the term "coupled" is used to designate an electrical connection between circuit elements that may be direct, or may be via one or more intermediate elements.

In the following description, when reference is made to terms "substantially", "approximately", "about", or "in the order of", this means to within 10%, preferably to within 5%.

FIG. 1 is a very simplified representation of an example of a system including a DC/DC converter.

In the described embodiments, a DC/DC converter 1 (DC/DC) is based on an inductive transformer 2 of a DC input voltage Vin, applied between two input terminals 11 and 13, into a DC output voltage Vout, delivered between two output terminals 15 and 17.

Input voltage Vin originates from a power source 32. Power source 32 may directly be a DC voltage generation or storage element, or may be formed of an upstream power conversion circuit (switched-mode power supply, linear regulator, AC/DC, DC/DC converter, etc.). Output voltage Vout is supplied to a load 34, for example formed of another energy conversion or regulation stage (switched-mode power supply, linear regulator, DC/AC, DC/DC converter, etc.), or of a gate control circuit (gate driver). Power source 32 delivers a power signal (high power) as opposed to control signals (low power) which are not meant to transmit energy capable of powering downstream circuits, but to transmit orders, information, or data.

According to the described embodiments, control signals also transit through converter 1. Thus, a signal CMD delivered by upstream circuits 32 of the converter on a terminal 12 is converted, with a galvanic isolation, into a signal CTRL supplied on a terminal 16 for downstream circuits 34.

Figure 2:
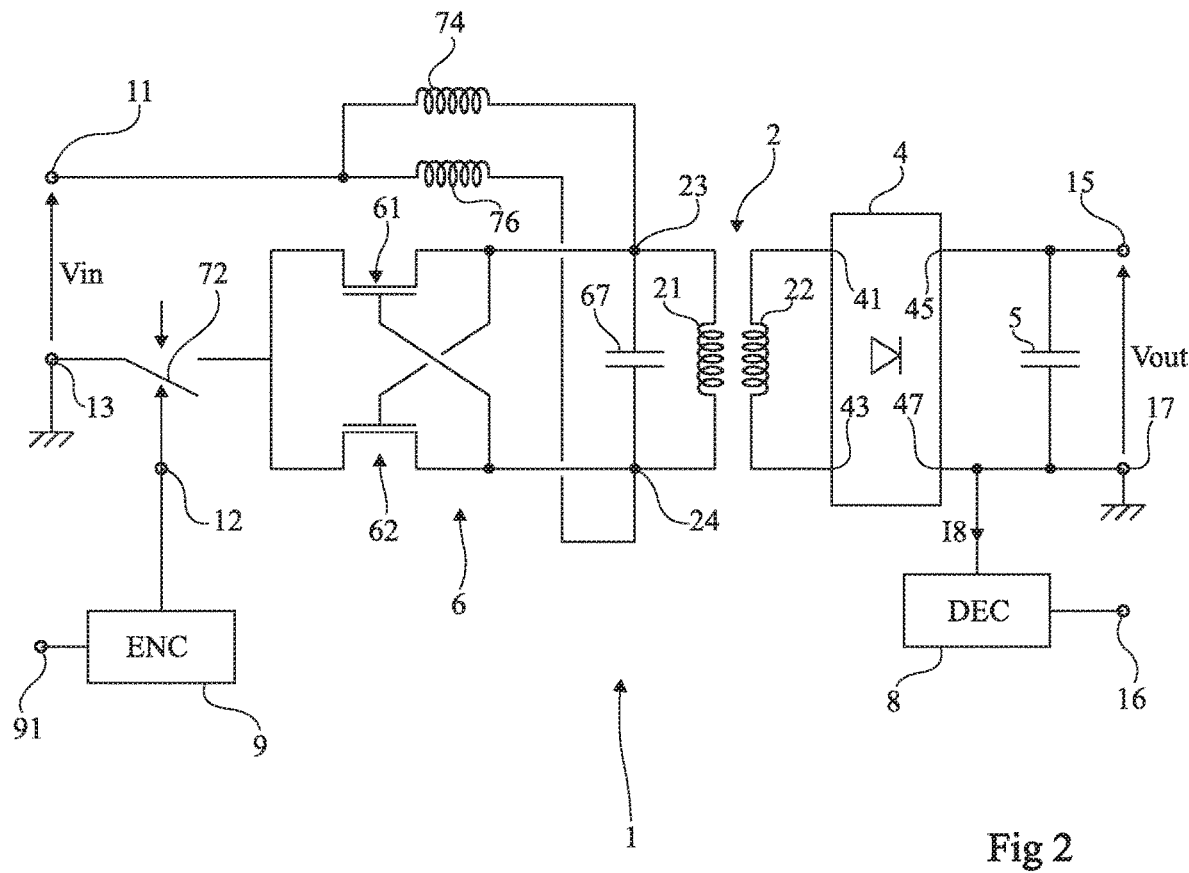
FIG. 2 very schematically shows an embodiment of a DC/DC converter.

FIG. 2 very schematically shows an embodiment of a DC/DC converter.

According to this embodiment, converter 1 comprises a transformer 2 comprising a primary winding 21 and a secondary winding 22.

Primary winding 21 is coupled, via a self-oscillating circuit 6, to input terminals 11 and 13 of application of DC voltage Vin, terminal 13 for example arbitrarily forming the ground on the primary side.

Circuit 6 is based on two switches 61 and 62, for example, MOS transistors, coupling the respective ends 23 and 24 of winding 21 together and having their respective gates coupled to terminals 24 and 23. Thus, the gate of transistor 61 is connected to the drain of transistor 62 and the gate of transistor 62 is connected to the drain of transistor 61. The sources of transistors 61 and 62 are interconnected and, in the shown example, are coupled to terminal 13 by a modulation switch 72. The function of switch 72 is to apply the control signal CMD to be transmitted to the secondary. The control terminal of switch 72 (the gate in the case of a MOS transistor) is coupled to terminal 12. Further, terminals 23 and 24 are respectively coupled, via inductive elements 74 and 76, to terminal 11 and are coupled to each other by a capacitive element 67. It can be considered that switch 72 and inductive elements 74 and 76 form a circuit of application of voltage Vin across self-oscillating circuit 6. Switch 72 receives signal CMD from a coding or modulation device 9 (ENC) receiving, on a terminal 91, a signal to be transmitted to the secondary. Device 9 may form part of circuit 32.

The secondary winding of transformer 2 is coupled to AC input terminals 41 and 43 of a rectifying circuit 4. The rectified output terminals 45 and 47 of bridge 4 are coupled to terminals 15 and 17 supplying voltage Vout, terminal 17 for example arbitrarily defining the ground on the secondary side (different from, and not connected to, the ground on the primary side due to the need for a galvanic isolation). A capacitive element 5 couples, preferably connects, terminals 45 and 47. Further, at least one of the output terminals 45 and 47 of bridge 4 (in the shown example, terminal 47) is coupled to the input of a circuit 8 for decoding (DEC) the transmitted signal (current I), having an output coupled to terminal 16.

FIGS. 3A, 3B, 3C, 3D, 3E, 3F, and 3G illustrate, in timing diagrams, the operation of the converter of FIG. 2.

Figure 3A:
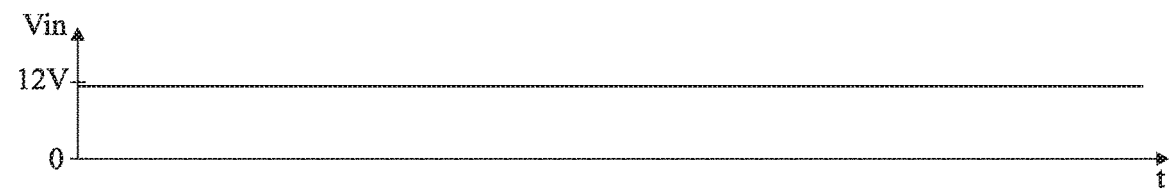
FIGS. 3A, 3B, 3C, 3D, 3E, 3F, and 3G illustrate, in timing diagrams, the operation of the converter of FIG. 2.
Figure 3B:
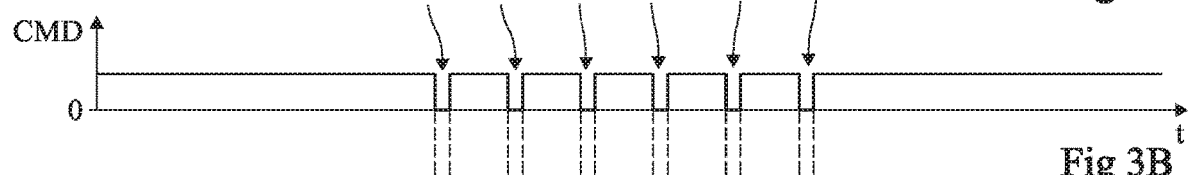
Figure 3C:
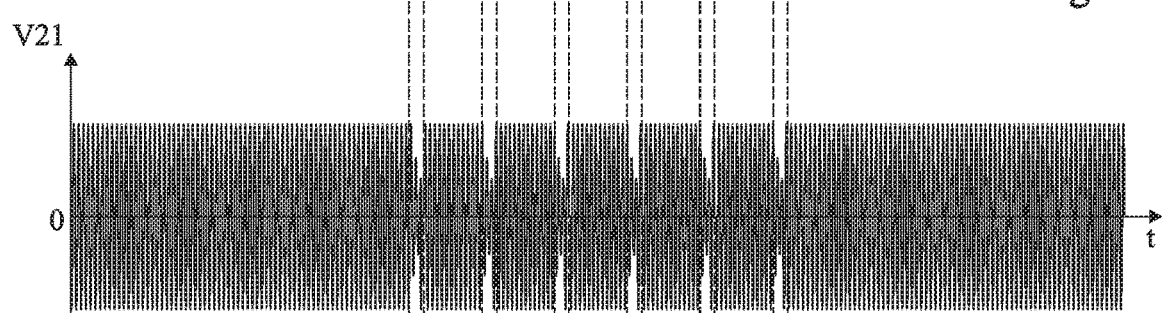
Figure 3D:
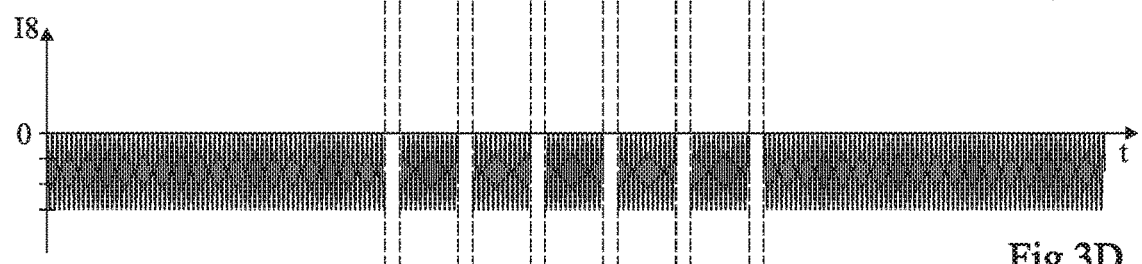
Figure 3E:
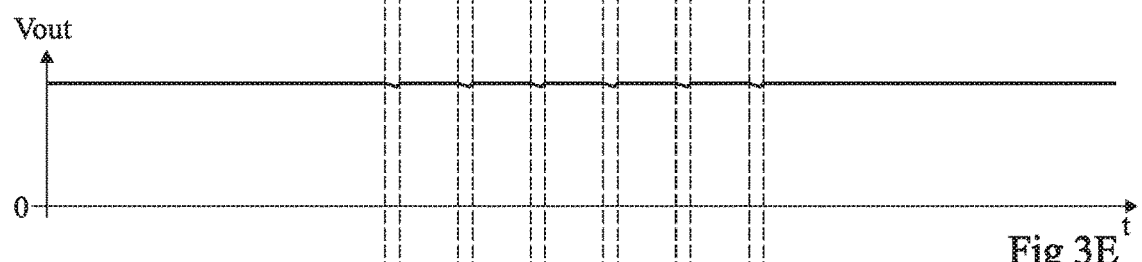
Figure 3F:
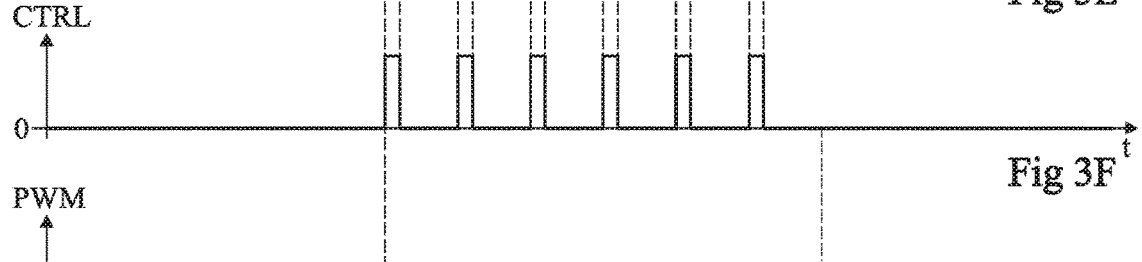
Figure 3G:
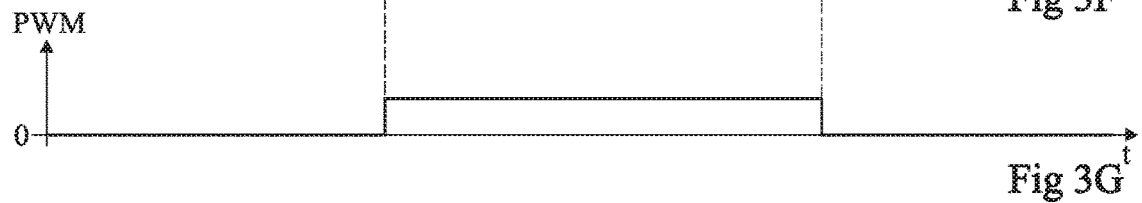

FIG. 3A shows an example of the shape of DC voltage Vin at the converter input. FIG. 3B illustrates an arbitrary example of signal CMD for controlling modulation switch 72 to the on state. FIG. 3C illustrates the corresponding shape of voltage V21 across inductive element 21. FIG. 3D illustrates the corresponding shape of current 18 flowing through bridge 4, detected by detector 8. FIG. 3E illustrates the corresponding shape of output voltage Vout of the converter. FIG. 3F illustrates the corresponding shape of signal CTRL supplied by detector 8. FIG. 3G illustrates an arbitrary example of coding of control signal CMD or CTRL in a PWM signal.

Typically, to transmit digital information or a digital signal, for example, the PWM signal, from the primary to the secondary, the signal to be transmitted, or first PWM signal, is converted, by device 9, into a signal CMD, or second signal, for controlling switch 72 to the on state. It can be considered that the first digital PWM signal to be transmitted to secondary 22 comprises first periods (square pulse in the high state in FIG. 3G) in a first state (1) and second periods (low state in FIG. 3G) in a second state (0). Second signal CMD, generated from the first signal, is in the quiescent state in one of the two states, for example, the first state (1), and comprises, during the first periods of first PWM signal, first trains (P, FIG. 3B) of pulses from the first state (1) to the second state (0).

The application of signal CMD to control the power supply of the oscillating circuit translates as interruptions of the power supply during pulses P.

On the secondary side, interruptions in the energy recovery which reflect pulses P can be observed. Current 18 (FIG. 3D) is thus representative of signal CMD. One can thus, at the secondary, reconstruct the shape of signal CMD in the form of signal CTRL (FIG. 3F), and then deduce therefrom or reconstruct (by demodulation, decoding, etc.) first PWM signal.

According to the described embodiments, the resonance frequency of the LC circuit (winding 21, capacitor 67) of self-oscillating circuit 6 is selected to be much greater (by a ratio of at least 10) than the maximum frequency of modulation pulses of signal CMD. Preferably, in an application where signal CMD is a pulse-width modulation (PWM) control signal of a switched-mode power supply powered by converter 1, the resonance frequency of the LC circuit (21-67) is much greater (by a ratio of at least 100) than the maximum frequency of the modulation pulses of signal CMD. With such a selection of the ratio of the different frequencies, it is ascertained that the supplied voltage Vout is not notably impacted by the modulation by the control signal.

In the example of FIGS. 3A to 3G, the presence of six pulses P for turning on switch 72 is assumed (FIG. 3B). Each of the turn-on operations is accompanied by a setting to the high impedance of the assembly of transistors 61 and 62. Terminal 13 being disconnected, not energy is provided by voltage Vin. The oscillating circuit formed of winding 21 and of capacitor 67 however keeps on oscillating (free oscillations) without for all this transmitting energy to the secondary (considering that the free oscillation duration is not sufficient, given the power consumption by load 34, so that voltage Vout drops sufficiently and turns on bridge 4). Thus, due to the use of a self-oscillating circuit and to the selection of its resonance frequency, voltage V21 (FIG. 3C) does not become zero during a pulse P. For this purpose, the width of a pulse P should represent but a few periods (less than five and, preferably, one or two) of the resonance frequency of circuit 6. Conversely, the system still operates but, according to the power consumption of the load, risks no longer respecting the holding of output voltage Vout.

Since voltage Vin is disconnected during pulses P for turning off switch 72, such pulses result, at the secondary of transformer 2, in an interruption of current 18 (FIG. 3D) in the diodes of rectifying bridge 4. On the side of output voltage Vout (FIG. 3E), the amplitude decrease remains negligible (if pulse P is sufficiently short as compared with the power consumption by load 34) and it can thus be considered that voltage Vout is not impacted by the control signal. The detection at the secondary, by decoder 8, corresponds to detecting the periods during which the diodes of bridge 4 conduct no current (FIG. 3F) and to shaping signal V16 to make it processable by the downstream circuits.

In the arbitrary example of FIGS. 3A to 3G, the case of a voltage Vin in the order of 12 volts is assumed. The case of a signal CMD intended to control the pulse width of a pulse width modulation signal PWM of a switch K (FIG. 4) forming part of another power circuit, not detailed, is considered. In the example of FIGS. 3A to 3G, it is assumed that the number of pulses of signal CMD (or CTRL) conditions the width of the pulse of the PWM signal in the high state.

The operation illustrated by FIGS. 3A to 3G corresponds to an operation in steady state, that is, once voltage Vout has reached its nominal value. In a starting or transient phase, voltage Vout progressively increases. In case of a modulation of voltage V21 by signal CMD, the drop of voltage Vout during a pulse for turning on switch 72 risks not being negligible. However, this only lasts for the time of the transient state necessary to establish the nominal value of output voltage Vout.

By taking advantage of the fact of being in steady state at the secondary, a disappearing of the power supply (of current 18 of the secondary) is authorized, without for this to notably impact the output voltage. Further, due to the self-oscillating circuit at the primary, the restarting is immediate, that is, there is no transient phenomenon of reestablishing of voltage V21 once switch 72 has been turned back off. This advantage is obtained due to the fact that the off time of switch 72 is in the order of one or two periods of natural oscillation of self-oscillating circuit 6.

Thus, as compared with a solution where the voltage is modulated in all or nothing on the primary side, there is no dead time due to the transmission of the control signal.

Figure 4:
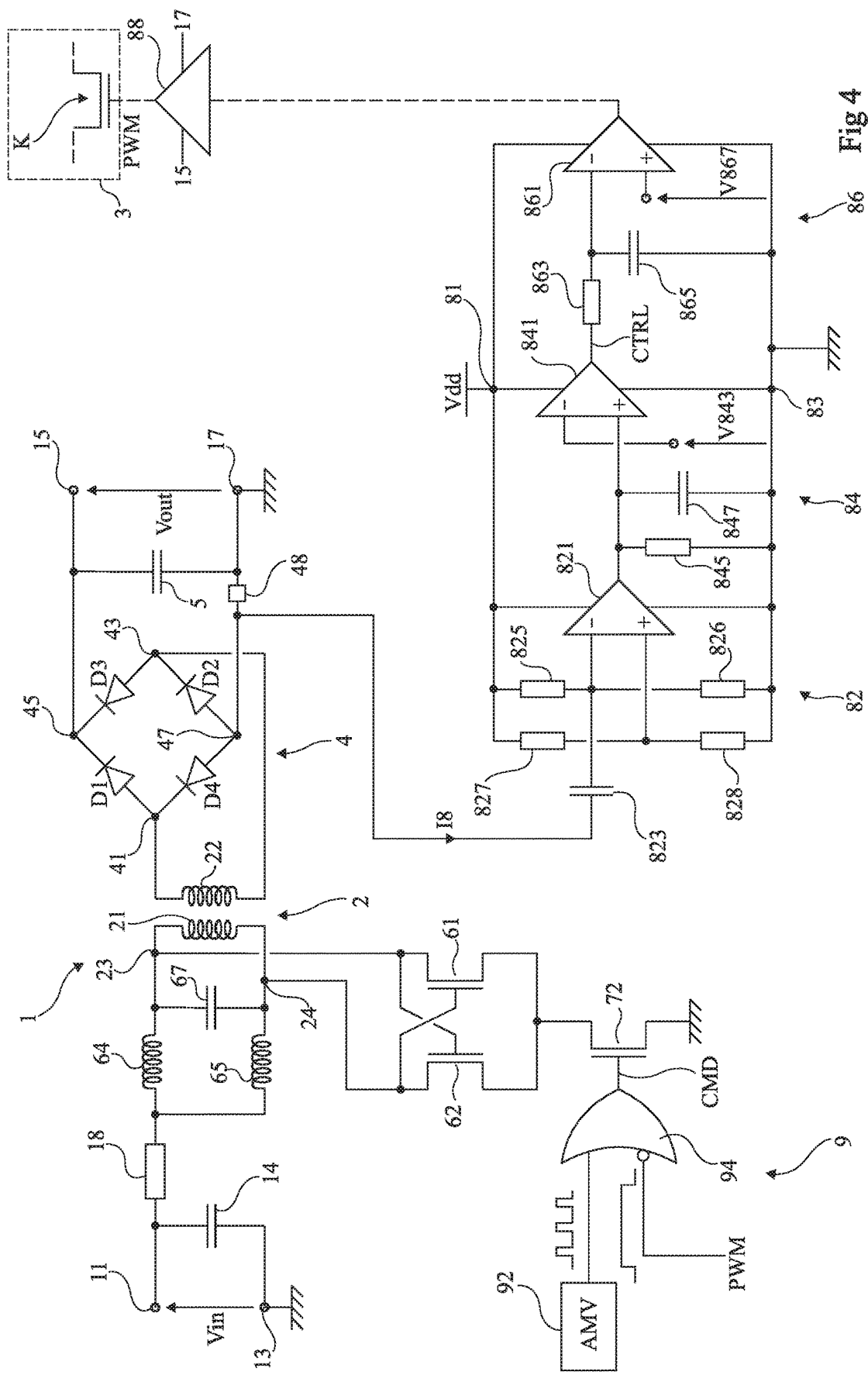
FIG. 4 very schematically shows a more detailed embodiment of a DC/DC converter.

FIG. 4 schematically shows a more detailed embodiment of a converter 1.

According to this embodiment, it is assumed that converter 1 supplies the energy to a circuit 88 for controlling the gate (gate driver) of a switch K (for example, a MOS power transistor) of a power circuit 3 (symbolized by dotted lines). Only transistor K has been illustrated in FIG. 4.

FIG. 4 more particularly details an example of a circuit 9 of generation of signal CMD from the PWM signal representative of the desired periods in the on state for switch K, and of decoding of circuit 8 enabling to reconstruct the PWM signal. Circuits 8 and 9 may form part of converter 1 as in FIG. 4 or may be respectively included on the side of source 32 and on the side of load 34 as in FIG. 1.

On the power signal side, FIG. 4 illustrates at the input (between terminals 11 and 13) a filtering capacitor 14 (low-pass) and a protection resistor 18 upstream of inductive elements 64 and 65. Rectifying bridge 4 is for example a fullwave bridge comprising four diodes. A diode D1 connects terminals 41 and 45 (anode on the side of terminal 41). A diode D2 connects terminals 47 and 43 (anode on the side of terminal 47). A diode D3 connects terminals 43 and 45 (anode on the side of terminal 43). A diode D4 connects terminals 47 and 41 (anode on the side of terminal 47).

Circuit 9 comprises, in this example, an astable multivibration circuit 92 (AMV), generating a periodic signal defining the frequency of pulses P (FIG. 3B). The forming of an astable multivibrator is usual per se. As a variation, the multivibrator is replaced with an oscillator supplying a periodic signal at a frequency greater (by a ratio of at least 10), than the frequency of the PWM signal to be transmitted to the secondary. The PWM signal is combined (gate 94) with the output of multivibrator 92 to generate signal CMD for controlling switch 72 to the off state. In the example of FIG. 4, switch 72 is formed of a MOS transistor and signal CMD is applied to the gate of the transistor. For example, transistor 72 is turned off when the signal is in the low state. Gate 94 then for example is an OR-type gate combining the signal supplied to multivibrator 92 with the inverse of the PWM signal (symbolized by an inverting input of gate 94).

Circuit 8 for decoding the current sampled from terminal 47 to reconstruct the PWM signal comprises, in operation, a current detector 82, an amplitude demodulator 84, and a shaping circuit 86.

Circuit 82 is based on a comparator 821 having an input (non-inverting for a current sampled from terminal 47) receiving a reference voltage and having an inverting input coupled, by a decoupling capacitor 823, to terminal 47. A current detection resistor 48 is interposed between the node from which current 18 is sampled on the side of terminal 47 and the electrode of capacitor 5 on the side of terminal 17. Capacitor 823 thus only gives way to the edges present on current 18, and thus the edges of pulses P (FIG. 3B). The inputs of comparator 821 are further each coupled to the midpoint of a resistive dividing bridge, respectively R825-R826 and R827-R828. The function of the dividing bridges is to apply, to the inputs of comparator 821, very close common-mode voltages, preferably approximately corresponding to half the power supply voltage Vdd of the comparator. The series associations of resistors 825-826 and 827-828 are thus coupled, preferably connected, to terminals 81 and 83 for supplying voltage Vdd. Voltage Vdd is for example extracted from voltage Vout or, more generally, supplied by the application downstream of converter 1 and powers circuit 8. In practice, three of the four resistors are provided to be identical, the fourth one being slightly different (by from 1/1000 to 1/100) to avoid an instability at the output of comparator 821. In steady state of the converter, when a stable current is present at the output of bridge 4, the comparator output is in a first state (arbitrarily selected to be low). For each pulse P, the output of comparator 821 switches and causes a pulse.

Circuit 84 (functionally an amplitude demodulation circuit) is based on a comparator 841 having an input (for example inverting) receiving a reference voltage V843 (smaller than voltage Vdd) and having its other input (for example, non-inverting) coupled to the output of comparator 821. The non-inverting input is further coupled to ground (terminal 83) by a parallel resistive and capacitive cell (resistor 845 and capacitor 847 in parallel between the output of comparator 821 and terminal 83). Circuit 84 enables to filter the output of circuit 82 and to supply signal CTRL in the high state during pulses P.

Shaping circuit 86 comprises a low-pass filtering cell formed of a resistor 863 between the output of circuit 84 (output of comparator 841) and an input (for example inverting) of a comparator 861, a capacitor 865 coupling this input to ground. The other input (for example, non-inverting) of comparator 861 receives a reference voltage V867 setting the switching voltage threshold of the output of comparator 861. The time constant of the RC cell (863-865) and voltage V867 are selected so that the output of comparator 861 remains stable (in this example, in the high state) for approximately one period CMD, that is, one period of the astable multivibrator. Such a duration should however be shorter than two periods of signal CMD, short of which the width of the pulses of the PWM signal is delivered back with an error margin of one period signal CMD. The output of comparator 861 supplies signal CTRL which restores the PWM signal. In practice, the PWM signal is then applied to the gate of a transistor forming switch K via circuit or amplifier (driver) 88, powered with voltage Vout (between terminals 15 and 17). Amplifier 88 receives the signal supplied by comparator 861 and its output is coupled to the gate of transistor K. Thus, in this example, the energy transferred from the primary to the secondary of the transformer is used to power the circuit (driver) for controlling power switch K, and the digital signal PWM transmitted from the primary to the secondary conditions the periods in the on state of the power switch.

Other embodiments of circuit 8 are possible, provided to respect the functionality of decoding of the pulses at the output of the rectifying bridge to reconstruct the original signal. Further, the high and low levels taken for the different signals are arbitrary and the inverse may be provided according to the application.

An advantage of the described embodiments is that they are compatible with usual PWM signal generation circuits, particularly for a switched-mode power supply. Indeed, the described converter may receive at input 12 a usual PWM signal and deliver back this signal downstream transparently for the upstream circuit having generated the PWM signal.

As a specific example of embodiment for a DC/DC converter having its output voltage intended to form the input voltage of a switched-mode converter and having its PWM signal intended to control a switch, the converter may be sized for the following characteristics:

resonance frequency of the LC circuit (21-67) in the range from some ten to a few tens of MHz;

frequency of modulating signal CMD in the order of a few MHz, with pulse durations P of one or two periods; and frequency of the PWM signal having a duty cycle modified according to the needs of the load powered by the switched-mode power supply, from approximately one Hz (or even 0 Hz) to a few hundreds of kHz.

An advantage of the described embodiments is that they enable to convey control signals through a galvanic isolation barrier, without adversely affecting the energy transmission through this same barrier.

Another advantage of the described embodiments is that the converter architecture is particularly simple.

Another advantage of the described embodiments is that they are compatible with the use of a transformer comprising no magnetic core.

Figure 5:
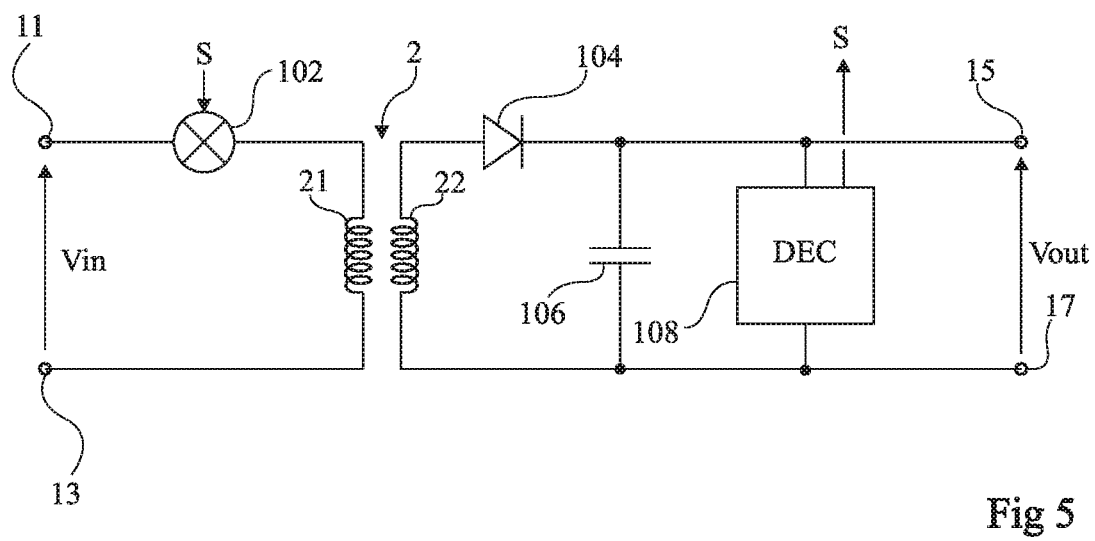
FIG. 5 very schematically shows a simplified embodiment of a system of transmission of a digital signal through a transformer.

FIG. 5 very schematically shows a simplified embodiment of a system of transmission of a digital signal through a transformer.

According to this embodiment, a DC voltage Vin, intended to be applied across the primary winding 21 of transformer 2, is mixed (mixer 102) with a modulating signal S to be transmitted. On the secondary side of transformer 2, a rectifying element 104 (or a bridge) rectifies a signal across secondary winding 22. The output of rectifying element 104 is coupled to a terminal 15 of supply of an output power supply voltage Vout, a capacitor 106 coupling output terminals 15 and 17. Output voltage Vout powers a circuit 108 (DEC) of detection of periods of interruption of the energy transfer between the primary and the secondary and thus restores an image of signal S. By respecting appropriate conditions relative to the frequency and the width of the pulses of digital signal S, the image of this signal is recovered without degrading power supply Vout.

Various embodiments and variations have been described. These various embodiments and variations may be combined and other variations will occur to those skilled in the art. For example, although the layout of switch 72 on the side of ground 13 is a preferred embodiment for reasons of reference of the control signals, the switch may be placed on the side of terminal 11. Further, the determination of the different values and the sizing of the components depend on the application and are within the abilities of those skilled in the art based on the functional indications given hereabove. Further, although reference has been more particularly made to the transmission of a low power signal of PWM control signal type, the described embodiments more generally transpose to any application of DC/DC power conversion with a control transmission where similar problems are posed.

What is claimed is:

1. A DC/DC converter, comprising:
   a transformer comprising a primary and a secondary, a winding of the primary forming part of a transformer power supply self-oscillating circuit;
   on the primary side, a controllable circuit intended to receive a first digital signal to be transmitted to the secondary and comprising a modulation device acting on said transformer power supply self-oscillating circuit on the side of the primary; and
   on the side of the secondary, a detection and de-modulation circuit for recovering said first signal,
   said first signal comprising first periods in a first state and second periods in a second state (0), said modulation device delivering a second signal for controlling a switch of application, when said second signal is in said first state, of a first DC voltage across said self-oscillating circuit, said second signal comprising first pulse trains in the second state during said first periods of the first signal and said detection and demodulation circuit to recover said first signal comprising a device for reconstructing said first pulse trains of said second signal based on interruptions of the energy recovered at the secondary, to deduce said first signal therefrom.

2. The converter of claim 1, wherein the first and second periods of the first signal form a second train of pulses having a frequency smaller than the frequency of the pulses contained in the first pulse trains of the second signal.

3. The converter of claim 2, wherein the frequency of the pulses of the first signal is greater, by a ratio of at least 10, than the frequency of the pulses contained in the first pulse trains of the second signal.

4. The converter of claim 1, wherein the resonance frequency of the self-oscillating circuit is greater, preferably by a ratio of at least 10, than the frequency of the pulses contained in the pulse trains of the second signal.

5. The converter of claim 1, wherein the detection circuit detects the presence or the absence of power transmitted to the secondary of the transformer.

6. The converter of claim 5, wherein the presence or the absence of transmitted power is detected by the presence or the absence of current via a voltage drop in a resistor.

7. The converter of claim 5, wherein the detection circuit detects the absence of a current at the output of a rectifying bridge having input terminals coupled across a secondary winding of the transformer.

8. A method of transmission of a digital signal by a DC/DC converter comprising a transformer, wherein:
   on the side of the primary of the transformer:
      a first digital signal, to be transmitted to the secondary and comprising first periods in a first state and second periods in a second state (0), is converted into a second signal comprising, during the first periods of the first signal, first trains of pulses from the first state to the second state (0); and
      a first DC voltage is applied across a self-oscillating circuit when the second signal is in the first state; and
   on the side of the secondary:
      the first pulse trains of the second signal are reconstructed from interruptions of the energy recovered at the secondary; and
      the first signal is deduced therefrom.

9. The method of claim 8, wherein the period of the pulses of the first pulse trains is shorter, preferably by a ratio of at least 10, than the self-oscillation period of the self-oscillating circuit.

10. The method of claim 8, wherein the duration of each pulse represents less than five, preferably one or two, self-oscillation periods of the self-oscillating circuit.

11. The method of claim 8, wherein the first and second periods of the first signal form a second pulse train having a frequency smaller than the frequency of the pulses contained in the first pulse trains of the second signal.

12. A method of transmission of a digital signal in a device comprising:
   a transformer comprising a primary and a secondary), a winding of the primary forming part of a transformer power supply self-oscillating circuit;
   on the primary side, a controllable circuit intended to receive a first digital signal to be transmitted to the secondary and comprising a modulation device acting on said transformer power supply self-oscillating circuit on the side of the primary; and
   on the side of the secondary, a detection and de-modulation circuit for recovering said first digital signal,
   said first digital signal comprising first periods in a first state and second periods in a second state, said modulation device delivering a second signal for controlling a switch of application, when said second signal is in said first state, of a first DC voltage across said self-oscillating circuit, said second signal comprising first pulse trains in the second state during said first periods of the first signal and said detection and demodulation circuit to recover said first digital signal comprising a device for reconstructing said first pulse trains of said second signal based on interruptions of the energy recovered at the secondary, to deduce said first signal therefrom,
   the method comprising:
      converting said first digital signal into said second signal by said modulation device;
      applying said first DC voltage by said switch when the second signal is in the first state; and
   on the side of the secondary:
      reconstructing said first pulse trains; and
      deducing said first signal therefrom.

* * * * *